United States Patent [19]

Osako et al.

[11] Patent Number: 5,733,962
[45] Date of Patent: Mar. 31, 1998

[54] POLYARYLENE SULFIDE RESIN COMPOSITION

[75] Inventors: Yasuhiro Osako; Tomoyoshi Murakami, both of Ichihara, Japan

[73] Assignee: Idemitsu Petrochemical Co., Ltd., Tokyo, Japan

[21] Appl. No.: 632,167

[22] Filed: Apr. 15, 1996

[30] Foreign Application Priority Data

Apr. 28, 1995 [JP] Japan .................................. 7-128978

[51] Int. Cl.$^6$ .............................. C08K 3/04; C08K 3/20; C08L 81/00
[52] U.S. Cl. .................. 524/449; 524/496; 524/609
[58] Field of Search ...................... 524/449, 609, 524/496

[56] References Cited

U.S. PATENT DOCUMENTS

| | | | |
|---|---|---|---|
| 4,985,175 | 1/1991 | Dziurla et al. | 525/68 |
| 5,216,109 | 6/1993 | Inata et al. | 528/272 |
| 5,296,186 | 3/1994 | Sobajima et al. | 524/584 |
| 5,500,471 | 3/1996 | Uota | 524/265 |

FOREIGN PATENT DOCUMENTS

| | | |
|---|---|---|
| 0 292 275 | 11/1988 | European Pat. Off. . |
| 0 328 964 | 8/1989 | European Pat. Off. . |
| 39 17 516 | 12/1990 | Germany . |
| 1-272665 | 10/1989 | Japan . |

OTHER PUBLICATIONS

Database WPI, Derwent Publication, AN 87–252456, and JP 62-172059, Jul. 29, 1987.
Database WPI, Derwent Publication, AN 86–243491, and JP 61-174262, Aug. 5, 1986.
Database WPI, Derwent Publication, AN 93–191613, and JP 05-117447, May 14, 1993.

*Primary Examiner*—Karen A. Dean
*Attorney, Agent, or Firm*—Oblon, Spivak, McClelland, Maier, & Neustadt, P.C.

[57] ABSTRACT

A polyarylene sulfide resin composition comprising as major components: (A) 100 parts by weight of a polyarylene sulfide resin; (B) 200–30 parts by weight of mica; (C) 150–30 parts by weight of carbon fiber; and (D) 30–0.5 parts by weight of conductive carbon black. Various parts with stable conductivity and high dimensional precision can be produced from this resin composition by one molding operation.

17 Claims, No Drawings

POLYARYLENE SULFIDE RESIN COMPOSITION

BACKGROUND OF THE INVENTION

1. Field of the Invention

The present invention relates to a polyarylene sulfide resin composition, and, more particularly, to a high quality polyarylene sulfide resin composition, which is useful as a material for high precision electrical or electronic parts.

2. Description of the Background Art

Reinforcement of a polyarylene sulfide (PAS) resin composition with carbon fiber is known to improve such characteristics of the resin composition as mechanical strength, sliding characteristics, and conductivity. In addition, various techniques for decreasing the anisotropic characteristics and improving the dimensional precision of this resin composition have been disclosed, such as a composition comprising PAS and carbon fiber with a short fiber length (Japanese Patent Publication No. 63590/1988) and a composition of PAS containing mica as a filler (Japanese Patent Publication No. 3230/1989).

However, it is difficult to obtain a composition with well balanced mechanical strength, dimensional precision, and conductivity by using only short carbon fiber as disclosed in Japanese Patent Publication No. 63590/1988. In addition, short carbon fiber not only improves these characteristics to a very limited extent, particularly the conductivity, but also unduly increases the production cost. Accordingly, other methods for improving these characteristics of PAS resin must be considered when a PAS resin composition is to be used for various parts as an alternative for metals such as aluminum.

The method of simply blending PAS and mica disclosed by Japanese Patent Publication No. 3230/1989, on the other hand, produces a composition with extremely insufficient rigidity and conductivity. It is very difficult to secure a balance between the dimensional precision and the conductivity. In an attempt to eliminate this drawback a method of treating mica with a conductive material or a method of adding carbon fiber or conductive carbon black have been proposed. Mica with a surface treated with metal, however, accelerates decomposition of the resin and may produce problems in terms of product quality and outward appearance of the products. In addition, the effect of conductivity improvement brought about by the surface treatment is limited. On the other hand, the method of adding carbon fiber or conductive carbon black can provide stable conductivity, but high dimensional precision of an order of 1/1000 is difficult to attain due to a large proportion of long fibers. Japanese Patent Publication No. 3230/1989 only discloses phlogopite-type micas (gold mica/suzolite mica). These micas are soft and contain a large amount of impurities as compared with muscovite-type mica (white mica). Accordingly, it is quite natural that the compositions containing these micas are inferior in terms of strength, elasticity, acid resistance, and the like. The present invention has been developed in view of this situation and has an object of providing a polyarylene sulfide resin composition from which various parts with stable conductivity and high dimensional precision can be produced by one molding operation.

SUMMARY OF THE INVENTION

Accordingly, the object of the present invention can be realized by the provision of a polyarylene sulfide resin composition comprising:

(A) 100 parts by weight of a polyarylene sulfide resin;
(B) 200–30 parts by weight of mica;
(C) 150–30 parts by weight of carbon fiber; and
(D) 30–0.5 parts by weight of conductive carbon black.

In a preferred embodiment of the present invention the mica (B) has a weight average particle size of 10–500 µm.

In another preferred embodiment of the present invention the content of $SiO_2$ plus $Al_2O_3$ in the total amount of mica (B) is 75% by weight or more and the weight average particle size of the mica (B) is 80–250 µm.

In still another preferred embodiment of the present invention the content of carbon fiber having an aspect ratio (the ratio of l/d, wherein l is the average fiber length and d is the average fiber diameter) of 10 or less in the total amount of the carbon fiber (C) is 60% by weight or more, and the content of carbon fiber having an aspect ratio of more than 10 in the total amount of the carbon fiber (C) is 25% by weight or less of the total amount of the mica (B) and the carbon fiber (C).

In a further preferred embodiment of the present invention the total amount of carbon fiber (C) is mild carbon fiber having an aspect ratio of 6 or less.

In a still further preferred embodiment of the present invention the total amount of carbon fiber (C) is mild carbon fiber having a carbon fiber diameter of 18–30 µm.

Other objects, features and advantages of the invention will hereinafter become more readily apparent from the following description.

DETAILED DESCRIPTION OF THE PREFERRED EMBODIMENTS

Preferred embodiments of the polyarylene sulfide resin composition of the present invention will now be illustrated in detail.

1. Components (1) Polyarylene Sulfide

The polyarylene sulfide (PAS) used as the component (A) in the present invention is a polymer containing 70 mol % or more of a recurring unit represented by Ar—S—, wherein Ar is an arylene group. A typical polyarylene sulfide is a polyphenylene sulfide containing 70 mol % or more of a recurring unit represented by the following formula (I),

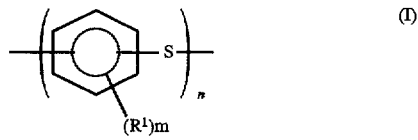

wherein $R^1$ is a group selected from the group consisting of alkyl groups having 6 or less carbon atoms, alkoxy groups having 6 or less carbon atoms, a phenyl group, carboxylic acid or metal salts thereof, a cyano group, an amino group, a nitro group, and halogen atoms such as fluorine, chlorine, or bromine; m is an integer of 0–4; and n denotes the average polymerization degree and is selected from the range of 1.3–30. In particular, an α-chloronaphthalene solution (concentration: 0.4 g/dl) having a logarithmic viscosity at 206° C. in the range of 0.1–0.5 dl/g, preferably 0.13–0.4 dl/g, and more preferably 0.15–0.35, is suitable.

Polyarylene sulfide with a low molecular weight to an extent which does not unduly affect the mechanical strength of the composition is used in the present invention. Such a molecular weight, in terms of a melt viscosity ($\eta_{app}$) within the range of the above logarithmic viscosity, is preferably 50 to 4,000 poise, and more preferably 80 to 2,000 poise.

Here, the melt viscosity ($\eta_{app}$) is a apparent viscosity measured by a micro-tube viscometer at a resin temperature of 300° C. and a shear rate of 200 sec$^{-1}$.

There are two types of polyarylene sulfide depending on the method of manufacturing; one is polyarylene sulfide having a substantially linear structure with no branch or cross-link, and the other is polyarylene sulfide having a branched or cross-linked structure. Both types of polyarylene sulfide can be used in the present invention. A preferred polyarylene sulfide in the present invention is a homopolymer or copolymer which comprises 70 mol % or more, preferably 80 mol % or more, of a paraphenylene sulfide unit as a recurring unit (such a homopolymer or copolymer is hereinafter called PPS). If the proportion of this recurring unit is less than 70 mol %, the crystalinity which is inherently possessed by a crystalline polymer is insufficient and it is difficult to ensure adequate mechanical characteristics. As the copolymerization unit for the PPS, an m-phenylene sulfide unit, an o-phenylene sulfide unit, a p,p'-diphenylene ketone sulfide unit, a p,p'-diphenylene sulfone sulfide unit, a p,p'-biphenylene sulfide unit, a p,p'-diphenylene ether sulfide unit, a p,p'-diphenylene methylene sulfide unit, a p,p'-diphenylene cumenylsulfide unit, a naphthylsulfide unit, and the like are given as examples. In addition to the above-mentioned substantially linear polymers, branched or cross-linked polyarylene sulfide obtained by polymerizing a monomer mixture which contains a small amount of monomers having three or more functional groups can be used. A blend of said linear polyarylene sulfide and these branched or cross-linked polyarylene sulfides is also preferably used. A polymer with improved molding processability, which is obtained by increasing the melt viscosity by oxidative cross-linking or thermal cross-linking of a linear polymer having a comparatively low molecular weight, is also preferably used as the component (A) in the present invention.

These polyarylene sulfide resins can be prepared by a process commonly known per se in the art such as, for example, a polycondensation reaction of a dihalo-aromatic compound and a sulfur source in an organic polar solvent.

Given as examples of the dihalo-aromatic compound are dihalo-benzene compounds, alkyl-substituted dihalo-benzene compounds, cycloalkyl-substituted dihalo-benzene compounds, aryl-substituted dihalo-benzene compounds, dihalo-biphenyl compounds, and dihalo-naphthalene compounds.

The two halogen atoms contained in these dihalo-aromatic compounds may be either the same or different and are selected from fluorine, chlorine, and bromine.

Given as examples of the sulfur source are alkali metal sulfides, such as lithium sulfide and sodium sulfide, alkaline earth metal sulfides, such as calcium sulfide and barium sulfide, and the like. These alkali metal sulfides and alkaline earth metal sulfides may be those obtained by the reaction of alkali metal hydro sulfides, such as lithium hydrosulfide and sodium hydrosulfide, or alkaline earth metal hydrosulfides, such as calcium hydrosulfide and barium hydrosulfide, and a base such as an alkali metal hydroxide.

As examples of the organic polar solvent, organic solvents such as amide compounds, lactam compounds, urea compounds, cyclic organic phosphorus compounds, and sulfone compounds, are given. Of these, particularly preferred compounds are N-alkyl lactam, particularly N-alkyl pyrrolidone, and sulforane.

In the present invention, the polyarylene sulfide resin obtained by the polycondensation reaction in the presence of a branching agent, such as a halogen aromatic compound containing an active hydrogen, a polyhalo compound having three or more halogen atoms per molecule, or a halo-aromatic nitro compound, or a molecular weight adjusting agent such as a mono-halo aromatic compound, can be used. The use of these branching agents or molecular weight adjusting agents can increase the degree of branching or the molecular weight, or can decrease the amount of residual salt in the resulting polyarylene sulfide, thereby improving various characteristics of the polyarylene sulfide.

Polyphenylene sulfide resin of the following formula (II) can be given as a preferred example of the polyarylene sulfide resin.

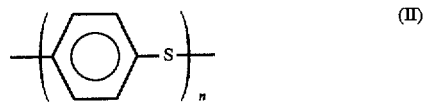

This resin is manufactured by Phillips Petroleum Company and commercially available under the trademark "Liton". The process for manufacturing this product, disclosed by U.S. Pat. No. 3,354,129 and Japanese Patent Publication No. 3368/1970 which corresponds to the U.S. Pat. No. 3,354,129, comprises reacting p-dichlorobenzene and sodium sulfide ($Na_2.SH_2O$) in a solvent of N-methylpyrrolidone while heating at 160°–250° C. under pressure. It is possible to manufacture polyphenylene sulfide with an increased degree of polymerization by the use of a catalyst such as lithium acetate or lithium chloride as disclosed by Japanese Patent Publication Nos. 12240/1977, 25588/1978, and 25589/1978.

(2) Mica (B)

Muscovite mica [$K_2Al_4(AlSi_3O10)_2(OH)_4$, white mica], phlogopite mica [$K_2Mg_6(AlSi_3O10)_2(OH)_4$, gold mica], and the like which are conventionally used as fillers for plastics are used without any specific limitation as the mica (B) in the present invention. Of these, muscovite mica (white mica) is more preferred. The use of muscovite mica produces resulting products with high strength and high rigidity and prevents deformation of the products during release from the mold, thereby ensuring improved dimensional precision in the molded articles.

Furthermore, it is desirable that the total amount of the $SiO_2$ component and $Al_2O_3$ component in the total amount of mica (B) be 75 wt % or more. If this amount is less than 75 wt %, the mica (B) becomes soft due to properties of other components contained in the mica (B) in a large proportion. The resulting polyarylene sulfide resin composition not only has insufficient strength, modulus of elasticity, and acid resistance, but also exhibits poor dimensional precision when molded.

Although there are no specific limitations to the shapes of the mica used in the present invention, mica having a weight average particle size of 10–500 μm and a weight average aspect ratio of 10–100 is preferably used. Mica having a weight average particle size of 30–300 μm and a weight average aspect ratio of 20–80 is more preferable, and that having a weight average particle size of 80–250 μm and a weight average aspect ratio of 40–70 is ideal. If the weight average particle size is less than 10 μm, the effect of improvement in the mechanical strength and dimensional precision is insufficient; if more than 500 μm, it is difficult to knead the composition. If the weight average aspect ratio is less than 10, the effect of improvement in the mechanical strength is insufficient; if more than 100 μm, the particle size of the mica is too large to easily knead the composition.

It is desirable that the mica (B) used in the present invention be surface-treated with a silane coupling agent or the like. Further, mica (B) may be processed by any optional treatment to improve the conductivity.

The amount of the mica (B) incorporated in the composition of the present invention is 200–30 parts by weight, and more preferably 150–50 parts by weight, for 100 parts by weight of the polyarylene sulfide resin (A). If this amount is less than 30 parts by weight, the effect of improvement in the dimensional precision is insufficient; if more than 200 parts by weight, not only is it difficult to knead the composition but also the fluidity of the composition during molding operation is impaired.

(3) Carbon Fiber (C)

Carbon fibers made from various raw materials, such as polyacrylonitrile (PAN), pitch, cellulose, aromatic compounds, or the like, are used as the component (C) of the present invention without any specific limitation. It is possible to use carbon fiber of which the surface is treated with known surface treatment agents such as epoxy compounds, polyurethane resins, and polyamide resins.

Carbon fiber having an average fiber diameter of 30 µm or less is preferably used, provided that the content of the carbon fiber with an aspect ratio 10 or less is preferably 60% by weight or more in the total amount of carbon fiber, and further provided that the content of carbon fiber having an aspect ratio of more than 10 is preferably 25% by weight or less of the total amount of the mica (B) and the carbon fiber (C). It is further preferable that all the carbon fiber (C) be mild carbon fiber having an aspect ratio of 6 or less. Furthermore, to produce molded products having good external appearance and excellent conductivity without affecting the dimensional precision, it is preferable that all the carbon fiber (C) be mild carbon fiber having a carbon fiber diameter of 18–30 µm.

The amount of the carbon fiber (C) incorporated in the composition of the present invention is 150–30 parts by weight, and more preferably 120–40 parts by weight, for 100 parts by weight of the polyarylene sulfide resin (A). If this amount is less than 30 parts by weight, not only the effect of reinforcement is insufficient, but also adequate conductivity cannot be obtained. More than 150 parts by weight makes it difficult to knead the composition, produces anisotropy in the molded products which may reduce the dimensional precision, and increases the raw material cost.

(4) Conductive Carbon Black (D)

Examples of the conductive carbon black (D) used in the present invention include, but are not limited to, high structure carbon black particles such as acetylene black and oil furnace black. Particularly preferred are carbon black particles having a particle size ($d_{50}$) of 100 nm or smaller, a nitrogen specific surface area of 10–5,000 $m^2/g$, a rate of DBP oil absorption of 50 $cm^3/100$ g or larger, and producing 2% or less desorption gas with heating at 950° C.

The amount of the conductive carbon black (D) incorporated in the composition of the present invention is 0.5–30 parts by weight, and more preferably 1–20 parts by weight, for 100 parts by weight of the polyarylene sulfide resin (A). If this amount is less than 0.5 part by weight, the conductivity is insufficient; if more than 30 parts by weight, not only is it difficult to knead the composition, but also the composition has poor fluidity during molding operation.

2. Preparation of the Composition

There are no specific limitations to the method for preparing the polyarylene sulfide resin composition of the present invention. A method of homogeneously dispersing the components in the resin by melt-kneading by a conventional manner is given as an example. Either a uni-axial kneader or a bi-axial kneader can be used under normal conditions for manufacturing conventional polyarylene sulfide. Therefore, a high temperature above 360° C. or an extremely high speed of rotation are not desired. A suitable amount of additives, such as pigments, thermal stabilizers, antioxidants, weather resisting agents, nucleation and growth agents, lubricants, and plasticisers, may be added to the resin composition. In addition, a suitable amount of other thermoplastic resins may be added. The resin composition in the form of pellets thus obtained is then molded into desired shapes using a molding machine for thermoplastic resins, such as an injection molding machine, a press molding machine, or an injection-press molding machine.

As illustrated above, the present invention provides a polyarylene sulfide resin composition from which various parts having stable conductivity and high dimensional precision can be produced in one molding operation without requiring any steps such as cutting.

Specifically, molded articles having a conductivity of 20 $\Omega$.cm or less and a dimensional precision of approximately 1/1000, which are equivalent to super precision electrical or electronic parts made by cutting from aluminum or aluminum alloy, can be obtained by molding the polyarylene sulfide resin composition of the present invention. In addition, the molded article has an excellent external appearance and smooth surface which help this article to exhibit superior sliding characteristics. Furthermore, the molded article is light in weight and can be produced at a low cost.

Other features of the invention will become apparent in the course of the following description of the exemplary embodiments which are given for illustration of the invention and are not intended to be limiting thereof.

EXAMPLES

Example 1

2,000 g of polyarylene sulfide (manufactured by Idemitsu Petrochemical Co., Ltd., $\eta_{app}$=500 poise), 1,840 g of mica 1 (80-D™, manufactured by Kuraray Co., Ltd., components: $K_2Al_4(AlSi_3O_{10})_2(OH)_4$ (white mica), the weight average particle size: 200 µm, the weight average aspect ratio: 60, with no surface treatment), 1,720 g of carbon fiber 1 (M-101T™, mild carbon fiber, manufactured by Kureha Chemical Industry Co., Ltd., average fiber diameter: 18 µm, aspect ratio: 6), and 160 g of carbon black (Ketchen Black EC-600JD™, manufactured by Lion Corp., $d_{50}$: 25 nm, nitrogen specific surface area: 1,000 $m^2/g$, DBP oil absorption: 350 $cm^3/100$ g, desorption gas with heating at 950° C.: 0.8%) were dry blended, and melt-kneaded using a bi-axial kneader (TEM35™, manufactured by Toshiba Machine Co., Ltd.) at a cylinder temperature of 300°–340° C. to produce a resin composition.

Example 2

A resin composition was prepared in the same manner as in Example 1, except that the amount of mica 1 was changed from 1,840 g to 1,600 g and the amount of carbon fiber 1 was changed from 1,720 to 1,260.

Example 3

A resin composition was prepared in the same manner as in Example 2, except that 1,260 g of carbon fiber 2 (CFM20-100T™, mild carbon fiber, manufactured by Mitsui Mining Co., Ltd., average fiber diameter: 20 µm, aspect ratio: 5) was used instead of carbon fiber 1.

Example 4

A resin composition was prepared in the same manner as in Example 2, except that 1,260 g of carbon fiber 3 (CMF- 40-N/s™, mild carbon fiber, manufactured by Toho Rayon Co., Ltd., average fiber diameter: 7 μm, aspect ratio: 6) was used instead of carbon fiber 1.

Example 5

A resin composition was prepared in the same manner as in Example 4, except that 1,600 g of mica 2 (150-K1™, manufactured by Kuraray Co., Ltd., components: $K_2Mg_6(AlSi_3O_{10})_2(OH)_4$ (gold mica), the weight average particle size: 200 μm, the weight average aspect ratio: 60, the surface treated with silane) was used instread of mica 1.

Example 6

A resin composition was prepared in the same manner as in Example 5, except that the amount of mica 2 was changed from 1,600 g to 2,540 g, the amount of carbon fiber 3 was changed from 1,260 to 840, and the amount of carbon black was changed from 160 g to 320 g.

Example 7

A resin composition was prepared in the same manner as in Example 5, except that the amount of mica 2 was changed from 1,600 g to 780 g, the amount of carbon fiber 3 was changed from 1,260 to 2,000, and the amount of carbon black was changed from 160 g to 80 g.

Example 8

A resin composition was prepared in the same manner as in Example 5, except that 1,260 g of mica 3 (325-K1™, manufactured by Kuraray Co., Ltd., components: $K_2Mg_6(AlSi_3O_{10})_2(OH)_4$ (gold mica), the weight average particle size: 40 μm, the weight average aspect ratio: 30, the surface treated with silane) was used instread of mica 2.

Example 9

A resin composition was prepared in the same manner as in Example 5, except that (I) the amount of carbon fiber 3 was changed from 1,260 g to 800 g, (ii) 460 g of carbon fiber 4 (HTA-C6SRS™, chopped carbon fiber, manufactured by Toho Rayon Co., Ltd., average fiber diameter: 7 μm, aspect ratio: 850) was additionally used, and (iii) the amount of carbon black was changed from 160 g to 80 g.

Example 10

A resin composition was prepared in the same manner as in Example 9, except that 1,600 g of mica 1 was used instead of mica 2, and 800 g of carbon fiber 1 was used instead of carbon fiber 3.

Comparative Example 1

A resin composition was prepared in the same manner as in Example 5, except that the amount of mica 2 was changed from 1,600 g to 2,000 g, and carbon fiber 3 and carbon black were not added.

Comparative Example 2

A resin composition was prepared in the same manner as in Example 5, except that no carbon black was added.

Comparative Example 3

A resin composition was prepared in the same manner as in Example 5, except that the amount of carbon fiber 3 was changed from 1,260 g to 2,260 g, and mica 2 and carbon black were not added.

Comparative Example 4

A resin composition was prepared in the same manner as in Example 5, except that 1,260 g of carbon fiber 4 was added instead of carbon fiber 3, and the amount of carbon black was changed from 160 g to 80 g.

Comparative Example 5

A resin composition was prepared in the same manner as in Example 5, except that 560 g of carbon fiber 3 and 800 g of carbon fiber 4 were added instead of 1,260 g of carbon fiber 3, and the amount of carbon black was changed from 160 g to 80 g.

Comparative Example 6

A resin composition was prepared in the same manner as in Example 5, except that the amount of mica 2 was changed from 1,600 g to 3,200 g, the amount of carbon fiber 3 was changed from 1,260 to 700, and the amount of carbon black was changed from 160 to 320.

Comparative Example 7

A resin composition was prepared in the same manner as in Example 5, except that the amount of mica 2 was changed from 1,600 g to 800 g, the amount of carbon fiber 3 was changed from 1,260 to 3,400, and the amount of carbon black was changed from 160 to 80.

Comparative Example 8

A resin composition was prepared in the same manner as in Example 5, except that the amount of carbon black was changed from 160 to 640.

To evaluate the characteristics of the resin compositions prepared in Examples and Comparative Examples, circularity (μm), volumetric resistance (Ω.cm), external appearance, bending strength (Mpa), and bending modulus of elasticity (Gpa) were measured. The results of the measurements, as well as the proportion of the components, for Examples 1–10 and Comparative Examples 1–8 are respectively shown in Table 1 and Table 2. These characteristics were measured according to the following methods.

<Measurement of Circularity>

Cylindrical drums (diameter: 60 mm φ, height: 15 mm) were molded using an injection molding machine (J50E-P™, manufactured by The Japan Steel Works, Ltd.) at a resin temperature of 340° C. and a molding die temperature of 135° C. After allowing the molded cylinders for 24 hours at room temperature, the circularity was measured by the circularity measuring device (RA-2™, manufactured by Sanpo Manufacturing Co., Ltd.).

<Measurement of Volume Resistivity>

Both ends of bending test leaves mentioned below were cut out to obtain plates with a length of 5 cm. A silver paste (Dotite™, made by Fujikura Chemical Co., Ltd.) was applied to the cut sections to measure the resistance at the both ends.

<Measurement of General Mechanical Strength>

Test pieces were prepared by an injection molding machine (J50E-P™, manufactured by The Japan Steel Works, Ltd.) and the bending test according to ASTM D790 was performed. The conditions for molding the test pieces were at resin temperature of 320° C. and molding die temperature of 135° C.

<Judgment of External Appearance>

The external appearance of the cylinders used for the measurement of circularity were evaluated by macroscopic observation according to the following standard.

| Judgment | External Appearance |
| --- | --- |
| ⊚ | Excellent glossy external appearance. |
| ○ | Glossy but there are some projections of fillers. |
| △ | No glossiness. Filler projections are remarkable. |
| × | No glossiness. The surface is roughened. |

TABLE 1

| | Example | | | | | | | | | |
| --- | --- | --- | --- | --- | --- | --- | --- | --- | --- | --- |
| | 1 | 2 | 3 | 4 | 5 | 6 | 7 | 8 | 9 | 10 |
| PPS | 100 | 100 | 100 | 100 | 100 | 100 | 100 | 100 | 100 | 100 |
| Mica 1 | 92 | 80 | 80 | 80 | | | | | | 80 |
| Mica 2 | | | | | 80 | 127 | 39 | | 80 | |
| Mica 3 | | | | | | | | 80 | | |
| Carbon Fiber 1 | 86 | 63 | | | | | | | | 40 |
| Carbon Fiber 2 | | | 63 | | | | | | | |
| Carbon Fiber 3 | | | | 63 | 63 | 42 | 100 | 63 | 40 | |
| Carbon Fiber 4 | | | | | | | | | 23 | 23 |
| Carbon Black | 8 | 8 | 8 | 8 | 8 | 16 | 4 | 8 | 4 | 4 |
| Circularity(μm) | 7 | 9 | 10 | 10 | 10 | 15 | 17 | 14 | 19 | 15 |
| Volume Resistivity(Ω · cm) | 1 | 4 | 4 | 5 | 5 | 3 | 3 | 5 | 5 | 4 |
| External Appearance | ⊚ | ⊚ | ⊚ | ○ | ○ | ○ | ○ | ○ | ○ | ⊚ |
| Bending Strength (Mpa) | 117 | 118 | 120 | 118 | 104 | 93 | 118 | 138 | 156 | 183 |
| Bending Modulus of Elasticity (Gpa) | 19.1 | 16.5 | 16.0 | 18.3 | 16.2 | 11.9 | 18.3 | 17.8 | 20.3 | 20.2 |

TABLE 2

| | Comparative Example | | | | | | | |
| --- | --- | --- | --- | --- | --- | --- | --- | --- |
| | 1 | 2 | 3 | 4 | 5 | 6 | 7 | 8 |
| PPS | 100 | 100 | 100 | 100 | 100 | 100 | 100 | 100 |
| Mica 2 | 100 | 80 | | 80 | 80 | 160 | 40 | 80 |
| Carbon Fiber 3 | | 63 | 113 | | 28 | 35 | 170 | 63 |
| Carbon Fiber 4 | | | | 63 | 40 | | | |
| Carbon Black | | | | 4 | 4 | 16 | 4 | 32 |
| Circularity (μm) | 69 | 13 | 30 | 52 | 43 | 69 | 72 | 65 |
| Volume Resistivity (Ω · cm) | >10² | >10² | >10² | 1 | 3 | 73 | 1 | 1 |
| External Appearance | ⊚ | ○ | △ | △ | △ | × | △ | × |
| Bending Strength (Mpa) | 105 | 101 | 204 | 168 | 165 | 77 | 144 | 55 |
| Bending Modulus of Elasticity (Gpa) | 11.8 | 15.9 | 20.6 | 22.1 | 21.8 | 10.8 | 20.8 | 9.5 |

Obviously, numerous modifications and variations of the present invention are possible in light of the above teachings. It is therefore to be understood that, Within the scope of the appended claims, the invention may be practiced otherwise than as specifically described herein.

What is claimed is:

1. A polyarylene sulfide resin composition comprising:
   (A) 100 parts by weight of a polyarylene sulfide resin;
   (B) 150–30 parts by weight of mica;
   (C) 150–30 parts by weight of carbon fiber; and
   (D) 20–0.5 parts by weight of conductive carbon black,
   wherein the content of carbon fiber having an aspect ratio (the ratio of l/d, wherein l is the average fiber length and d is the average fiber diameter) of 10 or less in the total amount of the carbon fiber (C) is 60% by weight or more, and the content of carbon fiber having an aspect ratio of more than 10 is 25% by weight or less of the total amount of mica (B) and carbon fiber (C).

2. The polyarylene sulfide resin composition as claimed in claim 1, wherein the mica (B) has a weight average particle size of 10–500 μm.

3. The polyarylene sulfide resin composition as claimed in claim 1, wherein the content of $SiO_2$ plus $Al_2O_3$ in the total amount of mica (B) is 75% by weight or more and the weight average particle size of mica (B) is 80–250 μm.

4. The polyarylene sulfide resin composition as claimed in claim 1, wherein the total amount of carbon fiber (C) is mild carbon fiber having an aspect ration of 6 or less.

5. The polyarylene sulfide resin composition as claimed in claim 2, wherein the total amount of carbon fiber (C) is mild carbon fiber having an aspect ration of 6 or less.

6. The polyarylene sulfide resin composition as claimed in claim 3, wherein the total amount of carbon fiber (C) is mild carbon fiber having an aspect ration of 6 or less.

7. The polyarylene sulfide resin composition as claimed in claim 1, wherein the total amount of carbon fiber (C) is mild carbon fiber having an aspect ration of 6 or less.

8. The polyarylene sulfide resin composition as claimed in claim 1, wherein the total amount of carbon fiber (C) is mild carbon fiber having a carbon fiber diameter of 18–30 μm.

9. The polyarylene sulfide resin composition as claimed in claim 2, wherein the total amount of carbon fiber (C) is mild carbon fiber having a carbon fiber diameter of 18–30 μm.

10. The polyarylene sulfide resin composition as claimed in claim 3, wherein the total amount of carbon fiber (C) is mild carbon fiber having a carbon fiber diameter of 18–30 μm.

11. The polyarylene sulfide resin composition as claimed in claim 1, wherein the total amount of carbon fiber (C) is mild carbon fiber having a carbon fiber diameter of 18–30 μm.

12. The polyarylene sulfide resin composition as claimed in claim 4, wherein the total amount of carbon fiber (C) is mild carbon fiber having a carbon fiber diameter of 18–30 μm.

13. The polyarylene sulfide resin composition as claimed in claim 5, the total amount of carbon fiber (C) is mild carbon fiber having a carbon fiber diameter of 18–30 μm.

14. The polyarylene sulfide resin composition as claimed in claim 6, wherein the total amount of carbon fiber (C) is mild carbon fiber having a carbon fiber diameter of 18–30 μm.

15. The polyarylene sulfide resin composition as claimed in claim 7, wherein the total amount of carbon fiber (C) is mild carbon fiber having a carbon fiber diameter of 18–30 μm.

16. The polyarylene sulfide resin composition as claimed in claim 1, wherein said polyarylene sulfide resin (A) is a polymer containing at least 70 mol % of a recurring unit represented by —Ar—S—, wherein Ar is a substituted or unsubstituted arylene group.

17. An article comprising the polyarylene sulfide resin composition as claimed in claim 1 and an effective amount of one or more elements selected from the group consisting of a pigment, thermal stabilizer, antioxidant, weather resisting agent, nucleation and growth agent, lubricant, plasticizer, and thermoplastic resin.

* * * * *